United States Patent [19]
Seu

[11] Patent Number: 5,779,376
[45] Date of Patent: Jul. 14, 1998

[54] PRINTER CARRIAGE DRIVE WITH MOVABLY MOUNTED MOTOR

[75] Inventor: Preston D. Seu, Vancouver, Wash.

[73] Assignee: Hewlett-Packard Company, Palo Alto, Calif.

[21] Appl. No.: 741,885

[22] Filed: Oct. 31, 1996

[51] Int. Cl.$^6$ ............................................. B41J 19/00
[52] U.S. Cl. .................. 400/335; 400/139; 400/154.2; 400/162.1
[58] Field of Search ........................ 400/335, 161, 400/162.1, 139, 154.2, 154.3, 162.2, 352

[56] References Cited

U.S. PATENT DOCUMENTS 3,908,809  9/1975  Beattie ............................ 400/162.1
4,479,731  10/1984  Kawaguchi ...................... 400/335

Primary Examiner—Edgar S. Burr
Assistant Examiner—Leslie Grohusky
Attorney, Agent, or Firm—H. Brian Davis

[57] ABSTRACT

Disclosed is an improved printer and carriage drive mechanism. The carriage motor is mounted at a first side of the printer chassis, and an idler pulley is mounted at a second side of the chassis. The carriage also has a pair of idler pulleys. A single flat smooth belt is attached to the first side of the chassis. From there, it passes over to and around one of the idler pulleys on the carriage, back to and around the motor pulley, across the print zone and around the idler pulley on the second side of the chassis, back to and around the other carriage idler pulley, and then back to the second side of the chassis, where it is attached. The motor is movably attached to the chassis and is tensioned by a spring. This mechanism provides for substantial mechanical advantage over common simple carriage drive mechanisms. A smaller, less expensive motor and a quieter flat smooth belt can be used. The motor is allowed to run at more optimal speeds and expensive ball bearings can be avoided in the motor and pulleys.

2 Claims, 2 Drawing Sheets

PRINTER CARRIAGE DRIVE WITH MOVABLY MOUNTED MOTOR

BACKGROUND OF THE INVENTION

1. Field of the Invention

The present invention relates generally to the field of printers, and more particularly to a printer with a scanning carriage assembly.

2. Statement of the Art

Many types of printers have a carriage that scans back and forth across a print zone. Held in the carriage is some type of printing mechanism, such as an inkjet or wire-dot matrix printhead. The carriage moves along rails, rods, or other low-friction members. A carriage motor is coupled to the carriage by means of a belt or cable. The motor drives the carriage back and forth as swaths of the image or text are printed on the selected print media (such as paper or overhead transparencies). After a print scan is completed, the print media is indexed in a direction normal to the scanning direction, so that another contiguous swath can be printed. In this way successive swaths are made to print the desired image and/or text on the media.

Low cost scanning printers typically use a simple pulley and belt and drive arrangement, such as illustrated in FIG. 2. A motor is positioned to one side of the print zone, and an idler pulley is attached to the printer chassis at the other side of the print zone. A belt is attached to the carriage, and from there it passes over to and 180° around the carriage motor pulley, across the print zone and 180° around the idler pulley, and then back to the carriage, where it is attached. These mechanisms typically use a motor pulley and belt with intermeshing cogs or teeth.

Carriage motors, which are d.c. motors, have a preferred range of loads and operational speeds. If the speed and load are not correctly matched to the motor, the motor can heat up and prematurely fail. A factor in the design of the carriage drive system is the size of the motor pulley. The pulley must be large enough so that the belt does not have to wrap around too small a radius. The fibers in the belt will fatigue if bent too tightly. However, a large drive pulley means that the motor must turn more slowly and under a greater load than may be optimal for the motor.

Another factor in limiting pulley diameters is rotary to linear transmission error, especially in a system using a toothed pulley and belt system. A smaller pulley will have fewer teeth. With fewer pulley teeth, the relationship between pulley rotation and belt transmission becomes more non-linear. This error can cause misplacement of dots and degraded print quality, and can also cause carriage system vibration and noise.

Some printers add speed reduction gears between the motor and drive pulley instead of a direct coupling. Such gear reduction gives the freedom to match the motor performance to the carriage load. The increased efficiency of this match lowers motor heating, so that a smaller and less expensive motor may be used. The disadvantages of such systems are gear noise and the cost of gears and their associated support. Gear noise is especially a problem at higher carriage speeds.

In most simple carriage drive mechanisms, belt or cable tension is maintained by spring loading the idler pulley as shown in FIG. 2. The belt tensioner compensates for belt stretch, thermal expansion and wear. If the tensioner forces are too low, the belt may go slack, which causes jerky carriage motion and noise from belt teeth skipping on the drive pulley. For this reason, some printers use a simple carriage drive mechanism in which the motor is spring loaded to maintain belt tension. For the same spring tension, spring loading the motor increases the net force between the motor pulley and belt.

One way to lower belt-induced noise and vibration is to replace the toothed pulley and belt with a smooth pulley and a compatible belt. This system relies on friction at the pulley and belt interface to transmit the forces. In order to achieve an appropriate amount of friction, the belt may need to be under fairly high tension. With this high tension, it may be necessary to use ball bearings for the motor and for the idler pulley, as compared to relatively less expensive bushings. The extra expense of using ball bearings is a significant disadvantage in the current market of low-cost color printers.

Some printers replace the motor pulley with a wide capstan and the belt with a wire cable. The cable is pegged at one point to the capstan and is coiled around the capstan several times on either side of the pegged point. Enough wire is wound onto the capstan so that the cable can completely uncoil on either side of the pegged point as the carriage scans back and forth across the print zone. Cable drive systems can be quiet, but are more expensive than belt drives. The parts are more expensive and assembly is more time consuming. The minimum bend diameter for avoiding premature cable fatigue is usually too large to match the motor to the carriage load in simple carriage drives.

Implementations of a half-speed carriage drive system, similar to that shown in FIG. 3 have been implemented with coiled wire and capstan systems. The motors are rigidly mounted to the printer chassis and the wire is stretched tightly between the chassis, the capstan, the carriage pulleys and the idler pulleys. The objective is to provide a system free of backlash in the wire as the carriage changes direction or accelerates, and to have enough mechanical advantage to use stepper motors. Because of the tightness of the cable, ball bearings are typically used in the motor and pulleys. Such mechanisms are typically used in higher priced products such as flatbed X–Y plotters, which can support the higher cost of the parts and materials.

There remains a need for a carriage drive mechanisms appropriate for a low-cost printer applications. Such a system would preferably use a smaller, less expensive motor that is correctly matched to the load and speed of the system. Such a system would preferably avoid the need for other expensive parts, such as ball bearings in the motors and pulleys, and would also avoid other problems mentioned, such as premature belt fatigue.

SUMMARY OF THE INVENTION

The invention provides a printer and carriage drive mechanism. A chassis is provided having a first side and a second side and a print zone between said first and second sides. A carriage is mounted to the chassis to traverse back and forth across the print zone, the carriage having a first idler pulley and a second idler pulley. A carriage motor is mounted at the first side of the chassis, the carriage motor having a motor pulley. A chassis idler pulley is mounted at the second side of the chassis. A flat belt is attached to the first side of the chassis, over to and wrapped around the first carriage idler pulley, back to and wrapped 180° around the motor pulley, across the print zone and wrapped around the chassis idler pulley, back to and wrapped around the second carriage idler pulley, and then back to and attached to the second side of the chassis.

In a preferred embodiment, the motor is movably mounted to the chassis and a tensioning device is attached to the chassis and the motor. The tensioning device is configured to resiliently urge the motor away from the second side of the carriage to thereby put tension on the belt. In one preferred embodiment, the belt is a flat smooth belt. However, in an alternative embodiment, the motor pulley and the belt are toothed.

The invention thus provides a carriage drive mechanisms appropriate for a low-cost printer applications. A smaller motor can be used, because the motor is more correctly matched to the load and speed of the system. A larger motor pulley can be used to avoid belt material fatigue, and the lower required tension reduces or avoids the need for ball bearings.

DETAILED DESCRIPTION OF THE ILLUSTRATED EMBODIMENT

Figure 1:
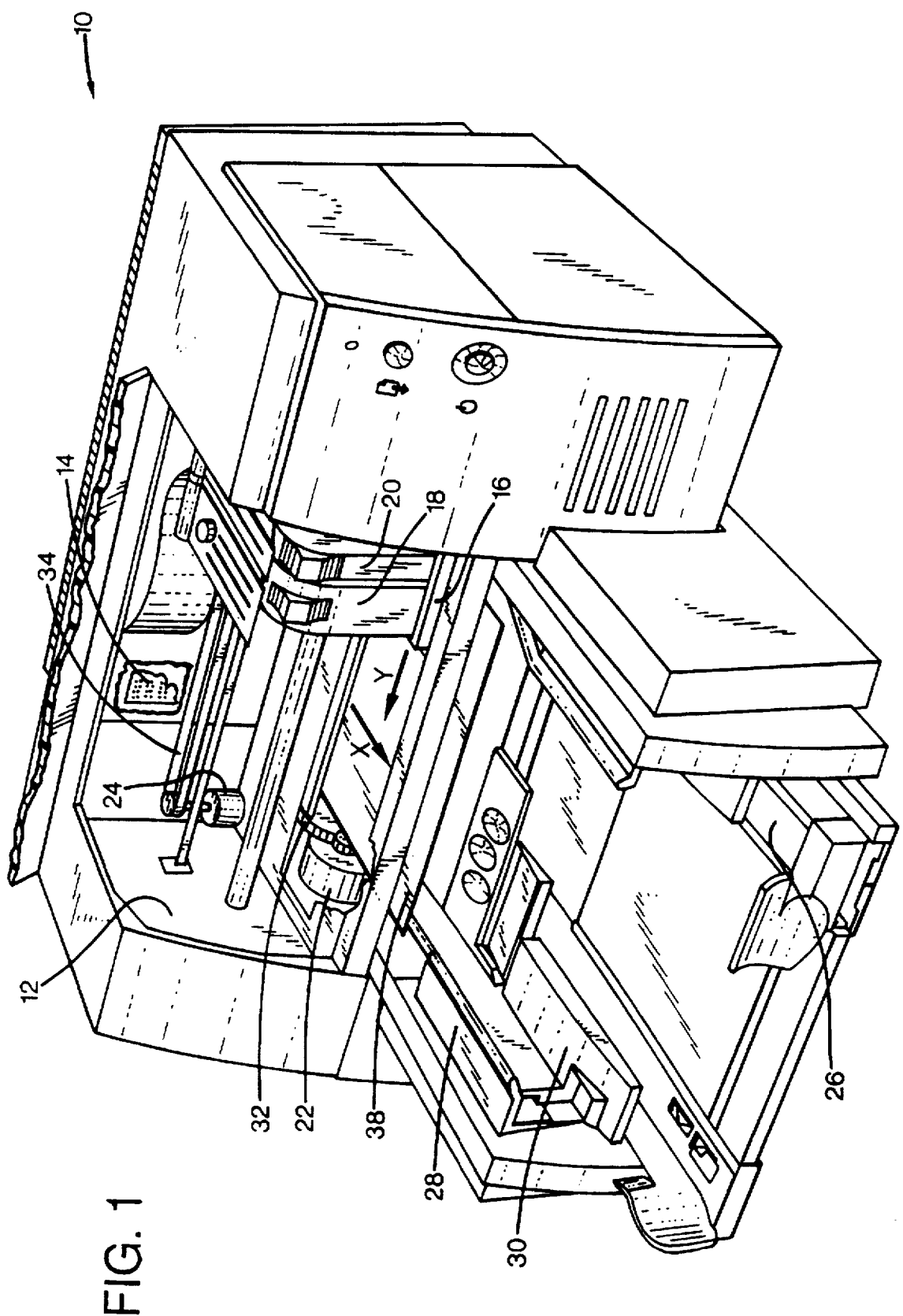
FIG. 1 is a perspective, partial cutaway, illustration of a printer of the invention.

FIG. 1 illustrates an inkjet printer, generally indicated at 10, of the invention. Printer 10 includes a chassis 12 in which are mounted a controller 14, a print cartridge carriage 16 (which receives print cartridges 18 and 20), medium advance motor 22, and carriage motor 24. Also attached to chassis 12 are a paper input tray 26, wings 28, and paper output tray 30. Controller 14 is communicatively connected to a host printing device (not shown), such as a personal computer, from which it receives data signals representative of the image and/or text desired to be printed. Controller 14 is also communicatively connected with printheads 18 and 20, medium-advance motor 22, and carriage motor 24. Medium-advance motor 22 is linked via a gearing assembly 32 to polymeric rollers (not shown) that drive the print medium through the printer. Medium-advance motor 22 is also engaged via a clutch and gearing assembly (not shown) to wings 28 to selectively (based on input from controller 14) open or close wings 28. Carriage motor 24 is linked via a drive belt 34 to carriage 16. A stack of paper is placed in the input tray 26. Sheet of paper 38 is shown being printed on.

At the appropriate time, controller 14 actuates carriage advance motor 24 to drive carriage 16 in the carriage advance axis Y to scan printheads 18 and 20 over the current swath on sheet 38. As print cartridges 18 and 20 containing printheads (not shown) are scanned in the Y direction, the printheads are addressed by controller 14 to expel droplets of ink in the desired dot matrix pattern across sheet 38. After a scan is complete, controller 14 sends a signal to medium-advance motor 22 to drive sheet 38 incrementally in the medium-advance direction X shown so that the printheads can begin another pass. Multiple adjacent horizontal passes are printed in this manner to complete the printing of the desired image on the page. More than one pass can also be made over the same section without advancing the paper. As page 38 is printed it rests on wings 28. After page 38 is completed, and when the previous page (resting in output tray 30) is dry and/or when a new page is ready to print, wings 28 open up and allow page 38 to drop vertically down onto the output tray. Since the previous page is typically relatively dry, and since page 38 drops vertically down onto this previous page, it is intended that no smearing of the ink will occur on the previous page.

Figure 2:
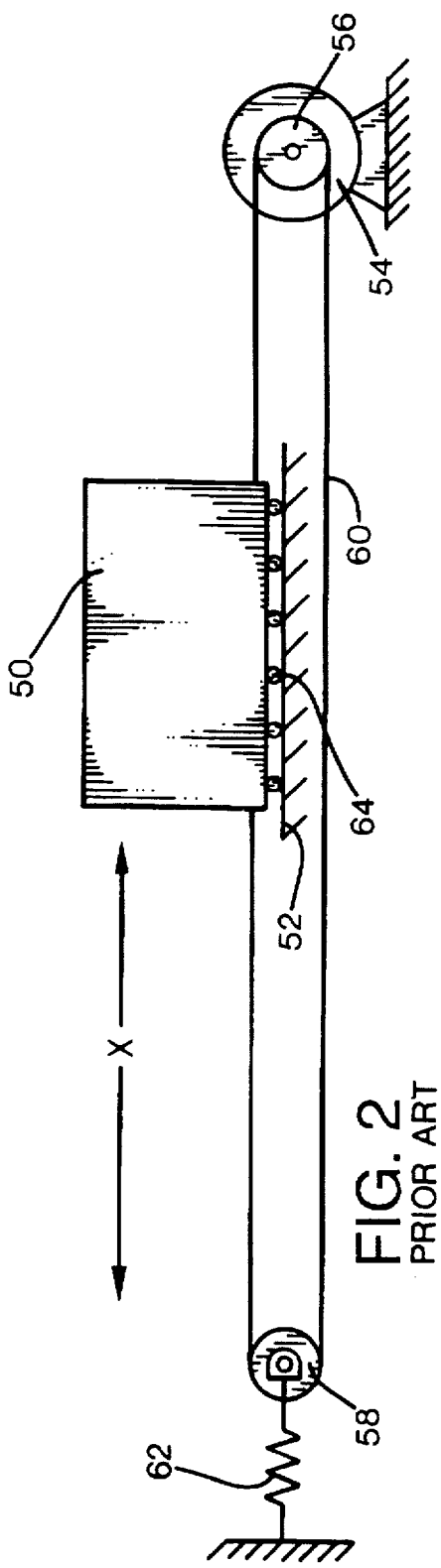
FIG. 2 is a schematic illustration of a prior art motor and carriage assembly.

FIG. 2 is a schematic illustration of a prior art carriage drive mechanism. This mechanism includes a carriage 50, platen 52, carriage motor 54, carriage motor pulley 56, idler pulley 58, belt 60, and tensioning spring 62. The space on the platen between the carriage motor 54 and the idler pulley 58 constitutes the print zone. The carriage 50 is slidably mounted with respect to platen 52, as schematically illustrated by means of rollers 64. Carriage motor 54 is mounted to one side of the print zone, as shown, and the idler pulley 58 is mounted at the other side. Belt 60 is attached to carriage 50, then wraps 180° around the motor pulley 56 and across the print zone over to the idler pulley 58. After wrapping 180° around the idler pulley, the other end of the belt attaches to the carriage. Tensioning spring 62 applies tension to the belt through the idler pulley to help avoid slack or backlash in the belt during change of direction or acceleration. A large enough motor pulley 56 must be used to avoid fatigue to the belt material. This pulley size is typically larger than is optimal for matching the motor to the carriage load. The motor is required to run under a higher load and at a slower speed than optimal, so that it heats up. To compensate for this, a larger motor, which can handle the higher load with less heat build up is used. This is disadvantageous, because the bigger motor is more expensive, and therefore adds cost to the printer.

If the load could be matched to the motor performance, in other words, if the motor could spin at a faster rate under less load, a smaller motor could be used. However, other systems discussed above which attempt to optimize the load seen by the motor require expensive parts or assembly or result in other disadvantages.

Figure 3:
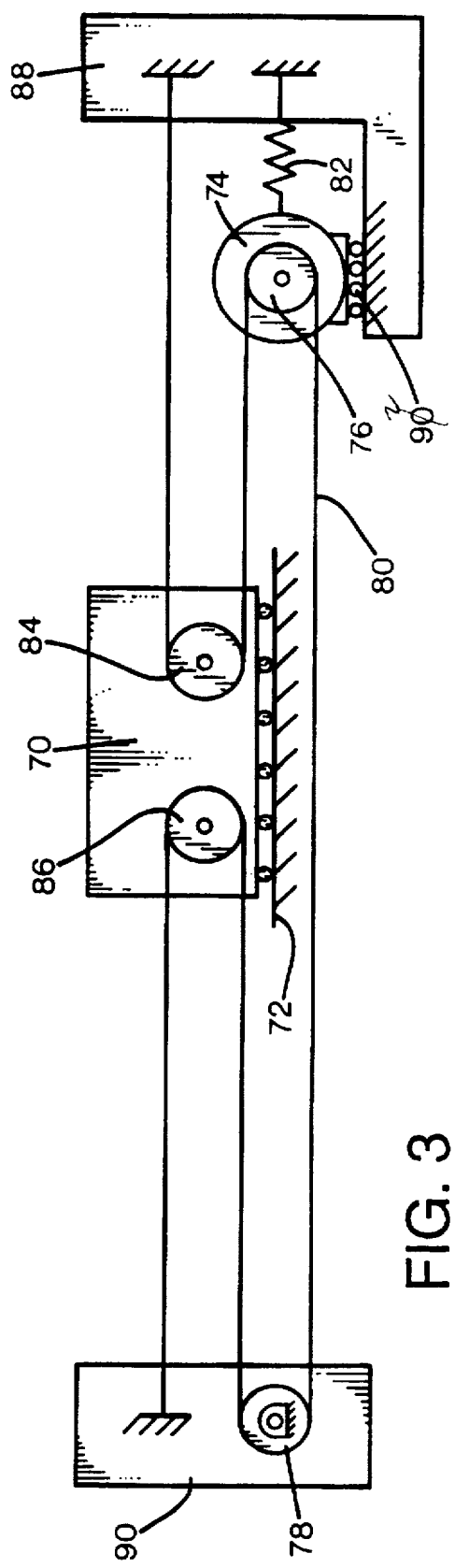
FIG. 3 is a schematic illustration of a motor and carriage assembly of the invention.

FIG. 3 illustrates a carriage drive mechanism that is suitable for a low-cost printer. This mechanism includes a carriage 70, platen 72, carriage motor 74, carriage pulley 76, chassis idler pulley 78, belt 80, and spring tensioner 82. Carriage 70 includes a first carriage idler pulley 84 and a second carriage idler pulley 86. As with FIG. 2, the carriage 70 is movable with respect to platen 72. Carriage motor 74 is movably mounted at a first side 88 of the printer chassis or housing, as schematically illustrated by rollers 92. The print zone of the printer lies between the first side 88 and the second side 90 of the printer.

Belt 80 is attached to the first side 88 of the printer chassis. It then passes over to and is wrapped 180° around the first carriage idler pulley, back to and wrapped 180° around the carriage motor pulley 76, across the print zone to and wrapped 180° around chassis idler pulley 78, over to and wrapped 180° around second carriage idler pulley 86, then back to and attached to the second side 90 of the printer chassis. Tensioning spring 82 places tension on the belt 80 through the motor pulley 76 and urges the motor away from the second side 90 of the chassis. The preferred combination of motor pulley and belt is a steel drive pulley and a neoprene belt.

As compared to the motor 54 in FIG. 2, the forces seen by the motor are cut in half. In other words, the carriage drive mechanism shown in FIG. 3 gives twice the mechanical advantage to the carriage motor. Of course this also means that for the same linear carriage speed, motor 74 must spin twice as fast as motor 54. However, this is an advantage because this allows motor 74 to run at a more optimal speed. An important advantage of the drive mechanism of FIG. 3 is that a much smaller and less expensive motor can be used.

The smaller motor can be used because of smaller forces seen by the motor pulley and because of the faster and more efficient speeds at which the motor can run.

Also, with less tendency for slippage at the pulley and belt interface, a lower amount of tension needs to be placed on the motor, belt, and pulleys. This is a significant advantage, because it alleviates the need for ball bearings in the motor or pulleys and reduces stress on the belt. The cost of ball bearings is a significant factor in low cost printers.

In addition, the arrangement of the tensioning spring on the carriage drive motor 74, as opposed to being on the chassis idler pulley 62 as in FIG. 2 is preferable, because it reduces the possibility for backlash or slack in the belt on either side of the motor pulley 76. This arrangement also reduces noise in the system by reducing motor vibration transmission to the printer structure. For the same tension forces on the spring, the spring-loaded the motor produces up to twice the net belt drive forces. This is true for either the simple drive or a half-speed drive. However, with the half-speed drive of FIG. 3, the spring-loaded motor provides up to four times the forces seen at the carriage. This effect also allows for lower belt tension.

This arrangement is beneficial in systems with either smooth belts or tooth belts. Even with a toothed belt, the lower belt tension reduces noise and vibration. However, the increased net belt drive force and the increased mechanical advantage of the mechanism of FIG. 3 allow for use of a smooth belt drive mechanism, as opposed to one with teeth. A flat smooth belt further reduces noise, vibration and irregularities in translational movement of the carriage 70.

The disclosed embodiment thus provides an improved and low cost printer and carriage drive mechanism.

I claim:

1. A printer comprising:

a chassis having a first side and a second side and a print zone between said first and second sides;

a carriage mounted to said chassis to traverse back and forth across said print zone, said carriage having a first idler pulley and a second idler pulley;

a carriage motor mounted at said first side of said chassis and having a motor pulley;

a chassis idler pulley mounted at said second side of said chassis; and a belt attached to said first side of said chassis, over to and wrapped around said first carriage idler pulley, back to and wrapped 180° around said motor pulley, across said print zone and wrapped around said chassis idler pulley, over to and wrapped around said second carriage idler pulley, then back to and attached to said second side of said chassis;

wherein said motor is movably mounted to said chassis and further comprising a tensioning device attached to said motor and configured to resiliently urge said motor away from said second side of said chassis.

2. A printer according to claim 1, wherein said belt is a flat smooth belt.

* * * * *